(12) United States Patent
Williams et al.

(10) Patent No.: US 10,718,300 B2
(45) Date of Patent: Jul. 21, 2020

(54) HIGH PERFORMANCE AIR INTAKE SYSTEM

(71) Applicant: K&N Engineering, Inc., Riverside, CA (US)

(72) Inventors: Steve Williams, Beaumont, CA (US); Jonathan R. Fiello, Yacaipa, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 15/452,595

(22) Filed: Mar. 7, 2017

(65) Prior Publication Data
US 2017/0260940 A1    Sep. 14, 2017

Related U.S. Application Data

(60) Provisional application No. 62/305,698, filed on Mar. 9, 2016.

(51) Int. Cl.
| | | |
|---|---|---|
| *F02M 35/10* | (2006.01) | |
| *F02M 35/024* | (2006.01) | |
| *F02M 35/04* | (2006.01) | |
| *B60K 11/06* | (2006.01) | |

(52) U.S. Cl.
CPC ....... *F02M 35/10268* (2013.01); *B60K 11/06* (2013.01); *F02M 35/02483* (2013.01); *F02M 35/048* (2013.01)

(58) Field of Classification Search
CPC ....... F02M 35/10268; F02M 35/02483; F02M 35/02475; F02M 35/048
See application file for complete search history.

(56) References Cited

U.S. PATENT DOCUMENTS

| | | |
|---|---|---|
| 2,244,403 A | 6/1941 | Root |
| 3,167,060 A | 1/1965 | Fowler |
| 3,996,914 A | 12/1976 | Crall et al. |
| 4,102,586 A * | 7/1978 | Pearson ................. A47C 31/06 267/110 |
| 4,264,961 A | 4/1981 | Nishimura et al. |
| 4,561,396 A | 12/1985 | Sakamoto et al. |
| 4,719,891 A | 1/1988 | Porth et al. |
| 4,986,244 A | 1/1991 | Kobayashi et al. |

(Continued)

FOREIGN PATENT DOCUMENTS

DE         3405935 A1      8/1985

OTHER PUBLICATIONS

International Search Report dated May 23, 2017.
International Search Report, PCT Application No. PCT/US2017/021430, dated May 25, 2017.

*Primary Examiner* — Jacob M Amick
(74) *Attorney, Agent, or Firm* — Rutan & Tucker LLP; Hani Z. Sayed

(57) ABSTRACT

An apparatus and method for a heat shield with an integrated air filter assembly is disclosed. Wherein the air filter assembly comprising a filter material circumferentially extending such that the filter material surrounds at least a portion of an interior cavity of the air filter, a distal end cap affixed to a distal end of the filter material, and a wire support extending along at least a portion of an exterior surface of the filter material; and wherein the heat shield is configured to direct cooler air into an air intake conduit extending from an intake portion of an automobile engine for combustion.

17 Claims, 5 Drawing Sheets

(56) References Cited

U.S. PATENT DOCUMENTS

| | | |
|---|---|---|
| 5,207,186 A | 5/1993 | Okita |
| 5,233,967 A | 8/1993 | Peller |
| 5,535,720 A | 7/1996 | Pantalleresco |
| 5,713,322 A | 2/1998 | Mausner et al. |
| 5,726,385 A * | 3/1998 | Lowery .................. H02G 3/081 174/50 |
| 5,937,816 A | 8/1999 | Wincewicz et al. |
| 6,374,815 B1 | 4/2002 | Ness et al. |
| 6,564,766 B2 | 5/2003 | Ayton |
| 6,833,023 B1 * | 12/2004 | Vandenberghe ..... B01D 29/906 55/337 |
| 7,281,511 B2 | 10/2007 | Quezada |
| 7,347,883 B2 | 3/2008 | Bajza et al. |
| 7,537,645 B2 | 5/2009 | Zambrano et al. |
| 7,686,873 B2 | 3/2010 | Kawatani |
| 8,181,728 B2 | 5/2012 | Hartland et al. |
| 8,337,579 B2 | 12/2012 | Alexander et al. |
| 8,652,238 B2 | 2/2014 | James |
| 8,851,220 B2 | 10/2014 | Abe et al. |
| 8,904,986 B1 | 12/2014 | James |
| 9,121,373 B2 | 9/2015 | Moyer et al. |
| 2001/0042541 A1 | 11/2001 | Moren |
| 2004/0107680 A1 | 6/2004 | Leibold |
| 2005/0210843 A1 | 9/2005 | Bajza et al. |
| 2005/0217625 A1 * | 10/2005 | Niaken ............. F02M 35/0203 123/184.21 |
| 2006/0196462 A1 | 9/2006 | Quezada |
| 2006/0260469 A1 | 11/2006 | Miyagishima et al. |
| 2007/0044750 A1 | 3/2007 | Niakan et al. |
| 2012/0198943 A1 | 8/2012 | Saito et al. |
| 2013/0228150 A1 | 9/2013 | Herbruck et al. |
| 2014/0096754 A1 | 4/2014 | Monros |
| 2014/0196400 A1 * | 7/2014 | Bell .................... E04D 13/0725 52/705 |
| 2015/0233327 A1 | 8/2015 | McClelland et al. |

* cited by examiner

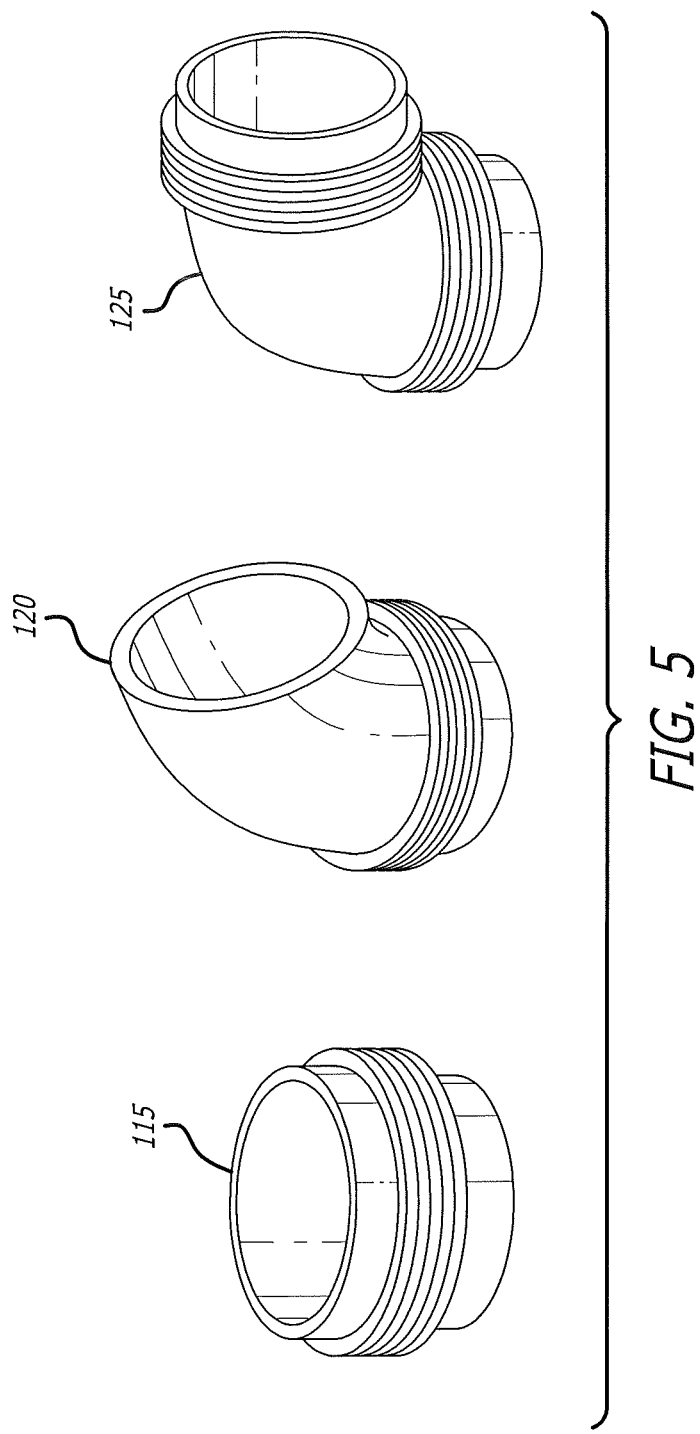

HIGH PERFORMANCE AIR INTAKE SYSTEM

CROSS-REFERENCE TO RELATED APPLICATIONS

This application claims the benefit of priority of U.S. Provisional Application No. 62/305,698, filed Mar. 9, 2016.

FIELD

The field of the present disclosure generally relates to air filters. More particularly, the field of the invention relates to an apparatus and a method for a heat shield with an integrated air filter assembly.

BACKGROUND

Air filters designed to remove particulates are generally composed of fibrous materials. These fibrous materials may remove solid particulates such as dust, pollen, mold, and bacteria from the air. Air filters are used in applications where air quality is important, notably in building ventilation systems and in engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally the air intakes of internal combustion engines and compressors tend to use either: paper, foam, or cotton filters. Some filters use an oil bath. Air filters for internal combustion engines prevents abrasive particulate matter from entering the engine's cylinders, where it would cause mechanical wear and oil contamination. Many fuel injected engines utilize a flat panel pleated paper filter element. This filter is usually placed inside an enclosed, plastic box connected to a throttle body by way of ductwork. Vehicles that use carburetors or throttle body fuel injection systems typically use a cylindrical air filter positioned above the carburetor or the throttle body.

Conventional enclosures for air filters have many drawbacks. For example, as particular matter builds up in the filter, air flow through the filter becomes restricted. Such a restricted air flow generally leads to a reduction in engine performance, such as a decrease in engine power output and a greater fuel consumption. Moreover, as the paper filter becomes increasingly clogged, pressure inside the filter decreases while the atmospheric air pressure outside the filter remains the same. When the difference in pressure becomes too great, contaminants may be drawn through the paper filter directly into the engine. Thus, the ability of the paper filter to protect the engine from contamination and internal damage tends to decrease near the end of the filter's service life.

An undesirable effect of conventional air filter enclosures is that warmer air tends to be received by the intake side of an automobile's engine, causing a significant reduction in engine performance. Therefore, what is needed is an air intake system that exhibits reduced air resistance, and an enclosure that is configured to reduce the amount of warm air entering the engine.

SUMMARY

An apparatus and a method are provided for a heat shield with an integrated air filter assembly to communicate air flow from an exterior of an air filter to an intake portion of an automobile engine. Due to the amount of heat that is dissipated by the engine of an automobile, for example, the heat shield is configured to protect components of the intake system such as the air filter assembly and optionally, the automobile's bodywork from potential heat damage. It is envisioned that the heat shield and integrated air filter assembly may provide desirable performance benefits by reducing intake air temperatures, thereby increasing engine performance, as discussed herein.

In one embodiment, the air filter comprises a filter material circumferentially extending such that the filter material surrounds at least a portion of an interior cavity of the air filter. An end cap is affixed to a distal end of the filter material, and a wire support may extend along at least a portion of the exterior surface of the filter material. The distal end cap and the wire support are configured to support the air filter and retain the filter material in a desired configuration.

In one embodiment, the heat shield comprises a partial housing portion and a mount portion. A front surface of the housing portion includes a conduit configured to receive an air intake conduit extending from the intake portion of the automobile engine. A back surface of the housing portion includes a recess configured to receive a proximal end of the filter material. The partial housing portion is configured to direct air drawn through the filter material into the interior cavity of the air filter and then through the conduit into the intake portion of the automobile engine. The mount portion is configured to support the heat shield and the air filter, once installed, within an interior of an automobile engine bay. In an embodiment, the air filter is fastened to the partial housing portion such that the air filter is irremovable from the heat shield. Rather than removing and replacing the air filter, as is common with conventional air filters, the air filter of the present invention may be periodically cleaned and reused. In an embodiment, the heat shield with the integrated air filter may be cleaned while installed within the engine bay by removing the air intake conduit of the automobile engine from the conduit of the heat shield, inserting a water hose through the conduit into the interior cavity of the air filter, and spraying water so as to flush contaminants from the filter material. The water and contaminants may drain from a bottom portion of the air filter and exit the engine bay.

In one embodiment, an apparatus for a heat shield with an integrated air filter assembly is disclosed, wherein the air filter assembly comprises a filter material circumferentially extending such that the filter material surrounds at least a portion of an interior cavity of the air filter, a distal end cap affixed to a distal end of the filter material, and a wire support extending along at least a portion of an exterior surface of the filter material; and wherein the heat shield is configured to direct cooler air into an air intake conduit extending from an intake portion of an automobile engine for combustion. In one embodiment, the air filter assembly is fastened to a housing portion such that the air filter assembly is irremovable from the heat shield.

In yet another embodiment, the heat shield is comprised of a material which is sufficiently durable and temperature resistant to retain its configuration during installation and operation. In one embodiment, the mount portion includes a suitable fastening means to facilitate installing the heat shield into the automobile engine bay.

In one embodiment, the fastening means is dependent on the specific make and model of the automobile with which the heat shield is to be used. In another embodiment, the transition provides a connection between the air intake conduit and the housing portion.

In one embodiment, the transition comprises a molded portion between the conduit and the housing portion. In another embodiment, the transition positions a longitudinal dimension of the conduit at an angle relative to the housing portion. In yet another embodiment, the angle between the conduit and the housing portion depends upon the particular automobile for which the heat shield is to be utilized.

In one embodiment, the opening has a diameter suitable to accept the air intake conduit of the automobile engine. In another embodiment, the heat shield and the air filter assembly are configured such that the air filter may be periodically cleaned without removing the air filter assembly from the heat shield. In yet another embodiment, the mount portion further comprises a plurality of structural supports.

In one embodiment, the structural supports are ribs configured to increase the rigidity of the mount portion. In another embodiment, the housing portion comprises a plurality of structural members. In yet another embodiment, the structural members are ribs configured to increase the rigidity of the housing portion.

BRIEF DESCRIPTION OF THE DRAWINGS

The drawings refer to embodiments of the present invention in which:

FIG. 5 is a side plan view of an exemplary embodiment of elements of a conduit.

Figure 1:
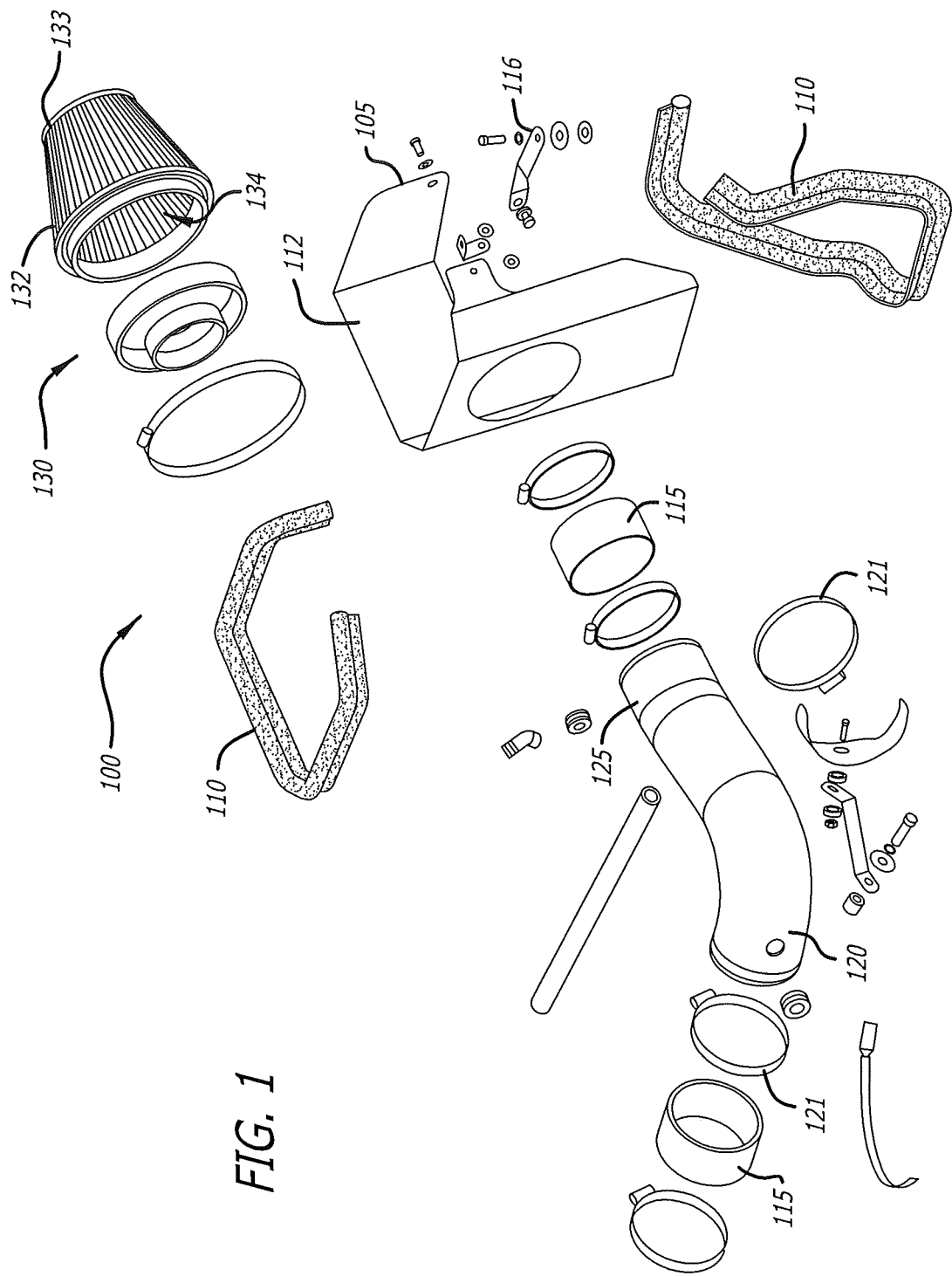
FIG. 1 is an exploded view of an exemplary embodiment of a heat shield with an integrated air filter assembly.

While the present invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present invention.

DETAILED DISCUSSION

In the following description, numerous specific details are set forth in order to provide a thorough understanding of the present invention. It will be apparent, however, to one of ordinary skill in the art that the present invention may be practiced without these specific details. In other instances, well known components or methods have not been described in detail but rather in a block diagram, or a schematic, in order to avoid unnecessarily obscuring the present invention. Further specific numeric references such as "first gasket," may be made. However, the specific numeric reference should not be interpreted as a literal sequential order but rather interpreted that the "first gasket" is different than a "second gasket." Thus, the specific details set forth are merely exemplary. The specific details may be varied from and still be contemplated to be within the spirit and scope of the present invention. The term "coupled" is defined as meaning connected either directly to the component or indirectly to the component through another component.

In general, the present invention describes an apparatus and a method for a heat shield with an integrated air filter to communicate air flow from an exterior of the air filter to an intake portion of an automobile engine. The air filter comprises a filter material circumferentially extending such that the filter material surrounds at least a portion of an interior cavity of the air filter. An end cap is affixed to a distal end of the filter material, and a wire support extends along at least a portion of the exterior surface of the filter material. The distal end cap and the wire support are configured to retain the filter material in a desired configuration and support the air filter.

The heat shield comprises a housing portion and a mount portion. A front surface of the housing portion includes a conduit configured to receive an air intake conduit extending from the intake portion of the automobile engine. A back surface of the housing portion includes a recess configured to receive a proximal end of the filter material. The housing portion is configured to direct air drawn through the filter material into the interior cavity of the air filter and then through the conduit into the intake portion of the automobile engine. The mount portion is configured to support the heat shield and the air filter, once installed, within an interior of an automobile engine bay.

FIG. 1 illustrates an exemplary embodiment 100 of a heat shield 105 with an integrated air filter assembly 130. With reference to FIG. 1, the heat shield 105 comprises a housing portion 112 and a mount portion 116. The heat shield 105 preferably is comprised of a material which is sufficiently durable and temperature resistant to retain its configuration during installation and operation when coupled with the air intake system of an automobile.

Preferably, the heat shield comprises a substantially metallic material, including by way of non-limiting example, aluminum, titanium, steel, and the like. In some embodiments, a thermal coating may also be disposed on one or more surfaces of the heat shield 105, so as to provide further reflective and/or heat resistant capabilities. It should be understood that the heat shield 105 may vary in size, shape and general configuration depending on the automobile, and especially the automobile's particular engine configuration. In general, the heat shield 105 is configured so as to direct cooler air into the engine for combustion. It should be appreciated that cooler air results in more oxygen being communicated to the combustion chamber, thereby desirably increasing the engine's performance.

The heat shield 105 generally is of a partially open variety, rather than being a fully enclosed configuration, such that the air intake assembly may be partially exposed to the elements. It should be appreciated that once the hood of the automobile is closed, the hood may come in contact with a top edge of the heat shield 105, so as to sealingly engage with a first gasket 110. It will be recognized by those skilled in the art that the open heat shield 105 improves airflow to the air filter assembly 130, and thus decreases air resistance to the intake portion of the automobile engine, thereby improving engine performance beyond that otherwise possible with conventional enclosures.

The mount portion 116 generally is configured to be mounted, or fastened, to the interior of an automobile engine bay. It is envisioned that the mount portion 116 is to include a suitable fastening means to facilitate installing the heat shield into the engine bay, such as, by way of example, suitably designed holes, brackets, molded shaped portions, protrusions, extensions, straps, hardware fasteners, or other any similar device for holding the heat shield fixed within the engine bay. It will be recognized that the particular fastening means will vary according to the specific make and model of the automobile with which the heat shield is to be used. As shown in FIG. 1, a first and second gasket 110, 112 may also be disposed on the upper and/or lower regions of the heat shield 105 so as to insulate the heat shield from engine bay heat.

The housing portion 112 generally is configured to support the air filter assembly 130 and provide an interface between the air filter assembly 130 and an intake portion of an automobile engine. An air intake conduit 118 extending to the intake portion of the automobile engine is also provided, and generally comprises arm 115, transition 120 and cylindrical region 125. Preferably, the transition 120 provides a molded connection between the conduit 118 and the housing portion 112, although other forms of connections will be apparent to those skilled in the art. The transition 120 generally positions a curved, longitudinal dimension of the conduit 118 at an angle relative to the housing portion 112. In one embodiment, the angle between the conduit 120 and the housing portion 112 is substantially 90-degrees. In other embodiments, the value of the angle between the conduit 120 and the housing portion 112 depends upon the particular automobile for which the heat shield 105 is to be utilized. It will be appreciated that a wide variety of different angles and shapes of the conduit 120 may be incorporated into other embodiments of the heat shield 105 without detracting from the present invention.

In one embodiment, the conduit 118 comprises a flange and an opening. The opening serves the function of conducting air drawn through the air filter assembly 130 into an interior cavity of the filter into the air intake of the automobile engine. It will be appreciated that the flange has a configuration and the opening has a diameter suitable to accept the air intake conduit of the automobile engine. For example, the flange may comprise any of a variety of additional ridges, or raised portions, so as to optimally engage the air intake conduit of the automobile engine. The specific configuration of the flange and the diameter of the opening depend upon the particular make and model of the engine for which the heat shield 105 is to be utilized, and thus a wide variety of configurations and diameters may be incorporated into the heat shield 105 without straying beyond the scope of the present invention.

It is envisioned that a user of the heat shield 105 may periodically clean the air filter assembly 130 rather than replacing the air filter assembly 130, as is typically done with conventional air filter systems. One embodiment of a method for cleaning the air filter assembly 130 comprises removing the air intake conduit 132 of the automobile from the conduit 118, inserting a water hose through the opening 133 into the interior cavity 134 of the filter, and spraying water so as to flush contaminants from the filter material. It is envisioned that the water and filter contaminants drain from a bottom portion of the air filter assembly and exit the engine bay. In another embodiment of the method for cleaning the air filter assembly 130, a high pressure air hose may be utilized in lieu of the water hose. In still another embodiment of the method for cleaning the air filter assembly 130, water may be sprayed onto the top of the filter, such that the water and contaminants drain from the bottom portion of the filter and exit the engine bay. Other cleaning methods will be apparent to those skilled in the art without deviating from the spirit and scope of the present invention.

Figure 2A:
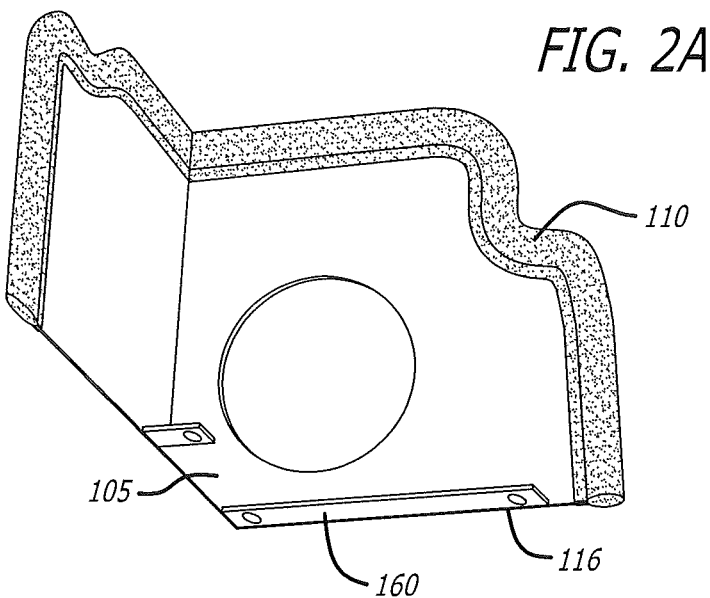
FIG. 2A is a lower perspective view of an exemplary embodiment of a heat shield.
Figure 2B:
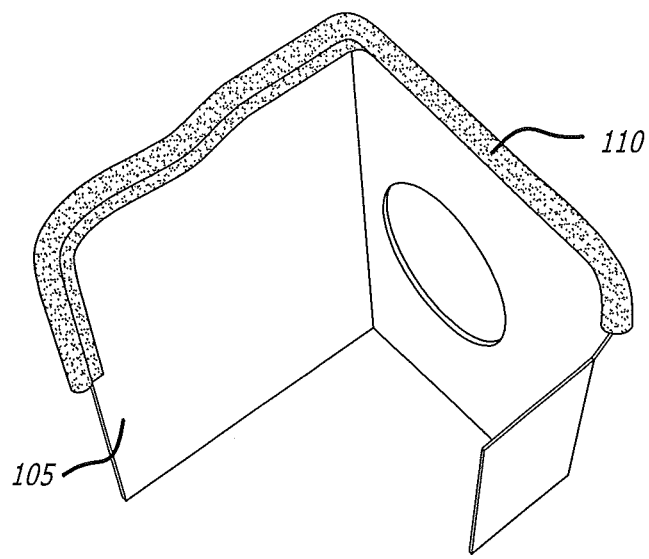
FIG. 2B is an upper perspective view of an exemplary embodiment of a heat shield.

As best shown in FIGS. 2A-2B, the mount portion 116 comprises a plurality of structural supports 160. In the illustrated embodiment of FIGS. 2A-2B, the structural supports 160 are ribs that increase the rigidity of the mount portion 116, as well as the connection between the mount portion 116 and the housing portion 112, thereby endowing the heat shield 105 with a resistance to warping when fastened within the engine bay. It will be appreciated by those skilled in the art that the structural supports 160 operate to keep the air filter assembly 130 advantageously positioned within the engine bay without requiring an enclosed heat shield. In one embodiment, the housing portion 112 may comprise a plurality of structural members that are substantially similar to the structural members 160. In still other embodiments, the housing portion 112 may comprise a plurality of structural members that are different than the structural members 160. Various embodiments of the structural supports 160 other than the ribs shown in FIGS. 2A-2B will be apparent to those skilled in the art. Furthermore, a gasket 110 may be disposed on one or more edges of the heat shield 105, so as to prevent vibrations and provide sealing engagement with one or more surfaces of the automobile.

As shown in FIG. 1, the filter material circumferentially surrounds the interior cavity 134 such that the filter material creates an exterior perimeter of at least a portion of the interior cavity 134. As mentioned above, the exterior shape may be generally circular, oval, conical, or otherwise shaped to improve the surface area available for air flow passage for a given volume of the interior cavity 136. The shape may be consistent along a longitudinal length or may vary along the length. For example, the outer profile may taper from the proximal end to the distal end cap.

As will be appreciated by those skilled in the art, the filter material provides a surface area through which to pass an air stream and trap particulate matter and other contaminates so as to prevent them from entering into the air intake of the automobile engine. The filter material may be comprised of paper, foam, cotton, spun fiberglass, or other known filter materials, woven or non-woven material, synthetic or natural, or any combination thereof. The filter material may be pleated or otherwise shaped or contoured to increase the surface area for passing the air stream to be cleaned. In other embodiments, the filter material may comprise a combination of materials to create a hybrid filter medium. In still other embodiments, the filter material may further comprise oil to enhance the air cleaning properties of the filter material. Other embodiments may include a depth loading feature which gives the air filter assembly 130 a high airflow with a low restriction while providing large contaminant holding capacities.

Figure 3:
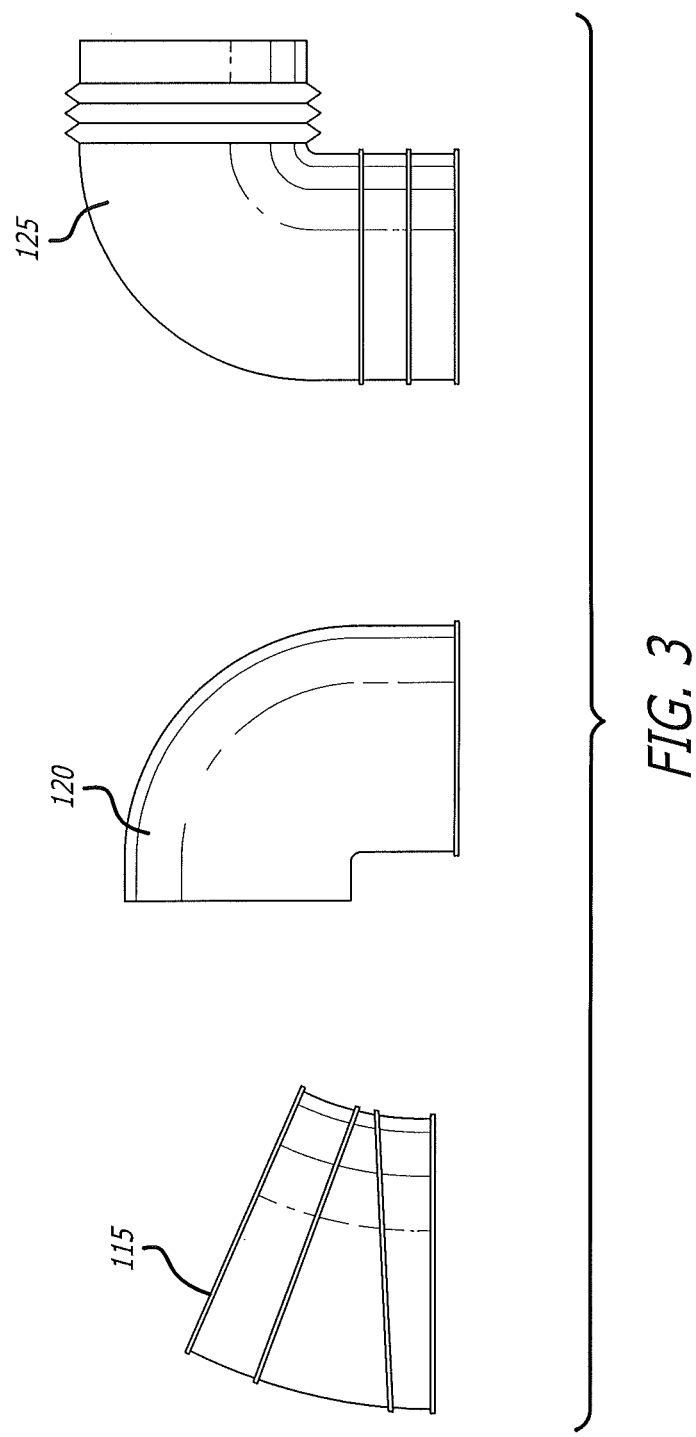
FIG. 3 is a side plan view of an exemplary embodiment of elements of a conduit.
Figure 4:
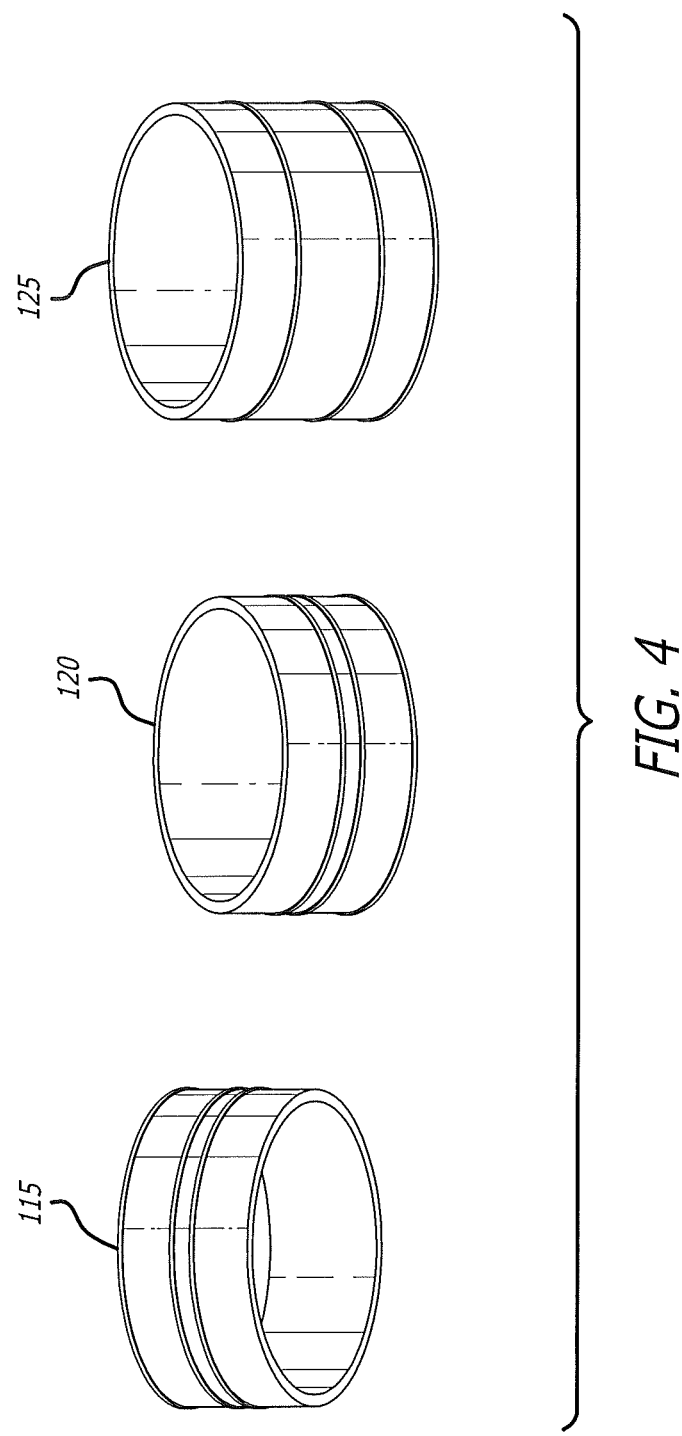
FIG. 4 is a side plan view of an exemplary embodiment of elements of a conduit.

Referring now to FIGS. 3-5, elements of the air intake conduit 118 that extend to the intake portion of the automobile engine are shown. The air intake conduit 118 generally comprises arm 115, transition 120 and cylindrical region 125. Preferably, elements of the air intake conduit 118 comprise of any of various molded plastics, synthetic materials, silicones and/or metals. In one embodiment, a carbon fiber tube may also be used. As shown, the arm 115, transition 120 and cylindrical region 125 may comprise a plurality of ribs 114 circumferentially disposed thereon, so as to couple with the transition 120 and cylindrical region 125. The ribs 114 may be disposed at various locations in varying number and widths as appropriate. It should be understood that elements of the air intake conduit 118 may be coupled together using any of various fastening means 121, such as, by way of example, suitably designed holes, brackets, molded shaped portions, protrusions, extensions, straps, hardware fasteners, or other any similar device for retaining purposes.

Although shown in a generally modular arrangement comprising molded elements, the air intake conduit 118 may also comprise a unitary construction. As shown in FIG. 3, the arm 115 comprises a substantially 30-degree bend, whereas the transition 120 and cylindrical region 125 comprise a 90-degree bend. However, as shown in FIG. 4, in one embodiment, the arm 115, transition 120 and cylindrical region 125 are configured so as to comprise substantially straight portions, without any bends. Finally, as shown in FIG. 5, the arm 115 comprises a hybrid construction, such that certain portions of the arm 115 are plastic, whereas other comprise metal. Furthermore, as shown, arm 155 comprises a substantially straight region without any bends. Transition 120 is shown as comprising a substantially 45-degree bend, whereas cylindrical region 125 comprises a substantially 90-degree bend. It should be appreciated that elements of the air intake conduit 118 may comprise any degree of bends as necessary depending on the application.

While some specific embodiments of the present invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The present invention is to be understood as not limited by the specific embodiments described herein, but only by scope of the appended claims.

The invention claimed is:

1. An apparatus comprising:
an air filter assembly including:
a filter material circumferentially extending from a first opening such that the filter material surrounds at least a portion of an interior cavity of the air filter,
a distal end cap affixed to a distal end of the filter material, and
a wire support extending along at least a portion of an exterior surface of the filter material; and
a heat shield including a housing portion and a mount portion, wherein the housing portion includes a plurality of walls including a first wall that includes a conduit configured to receive an air intake conduit extending from an automobile, wherein structural supports being ribs that include a first rib extending from the first wall perpendicularly toward an interior of the heat shield, and a second rib extending from a second wall of the plurality of walls, each of the ribs configured to increase a rigidity of the mount portion, and wherein the heat shield is configured to direct cooler air into the air intake conduit extending from an intake portion of an automobile engine of the automobile for combustion, wherein the first rib has a length being at least a majority of a length of the first wall.

2. The apparatus of claim 1, wherein the air filter assembly is fastened to the housing portion such that the air filter assembly is secured to the heat shield.

3. The apparatus of claim 1, wherein the heat shield is comprised of a material which is sufficiently durable and temperature resistant to retain its configuration during installation and operation.

4. The apparatus of claim 1, wherein the mount portion includes a suitable fastening means to facilitate installing the heat shield into the automobile engine bay.

5. The apparatus of claim 4, wherein the fastening means is dependent on the specific make and model of the automobile with which the heat shield is to be used.

6. The apparatus of claim 2, wherein a transition provides a connection between the air intake conduit and the housing portion.

7. The apparatus of claim 6, wherein the transition comprises a molded portion between the conduit and the housing portion.

8. The apparatus of claim 6, wherein the transition positions a longitudinal dimension of the conduit at an angle relative to the housing portion.

9. The apparatus of claim 8, wherein the angle between the conduit and the housing portion depends upon a particular automobile for which the heat shield is to be utilized.

10. The apparatus of claim 1, wherein the opening has a diameter suitable to accept the air intake conduit of the automobile engine.

11. The apparatus of claim 1, wherein the heat shield and the air filter assembly are configured such that the air filter may be periodically cleaned without removing the air filter assembly from the heat shield.

12. The apparatus of claim 2, wherein the housing portion comprises a plurality of structural members.

13. The apparatus of claim 12, wherein the structural members are ribs configured to increase the rigidity of the housing portion.

14. The apparatus of claim 1, wherein a back surface of the housing portion includes a recess configured to receive a proximal end of the filter material.

15. The apparatus of claim 1, wherein the heat shield includes a thermal coating disposed on at least one surface of the heat shield, and wherein the thermal coating is configured to reflect or resist heat.

16. The apparatus of claim 1, wherein the second rib has a length being less than a majority of a length of second first wall.

17. The apparatus of claim 1, further comprising:
a first gasket coupled to an upper rim of the heat shield, wherein the heat shield is configured such that the first gasket contacts a surface of a hood of the automobile to sealingly engage with the hood.

* * * * *